No. 739,243. PATENTED SEPT. 15, 1903.
J. F. WHITE.
ELEVATOR.
APPLICATION FILED MAR. 30, 1903.
NO MODEL. 3 SHEETS—SHEET 1.
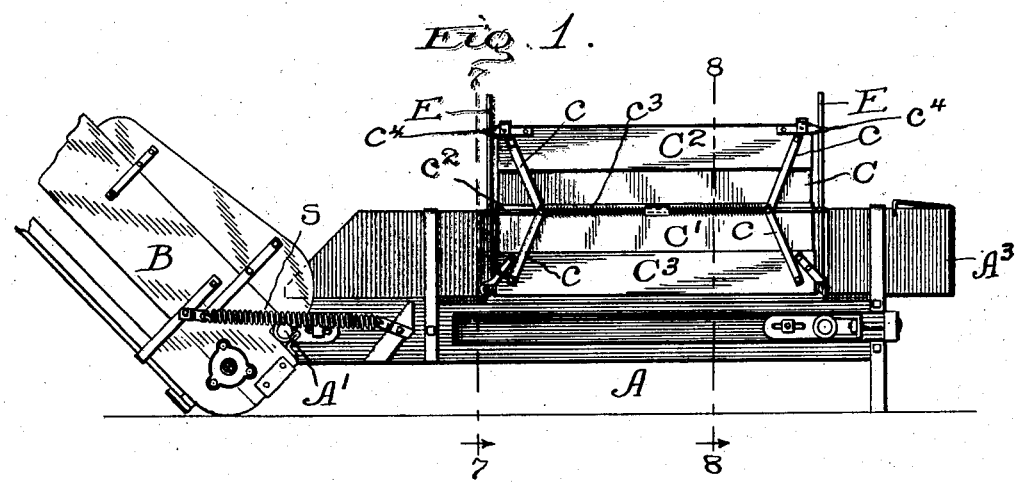
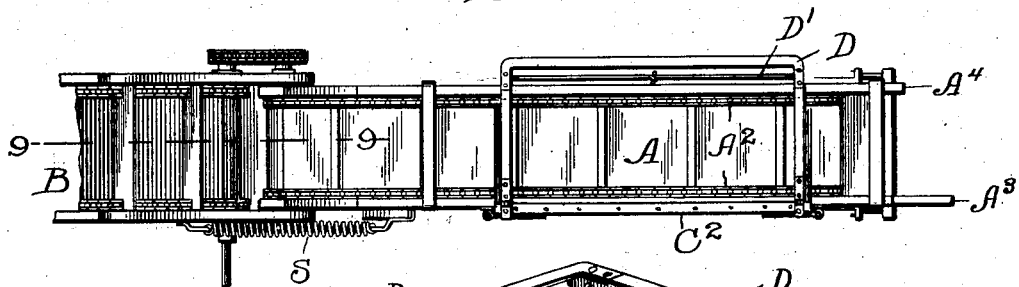
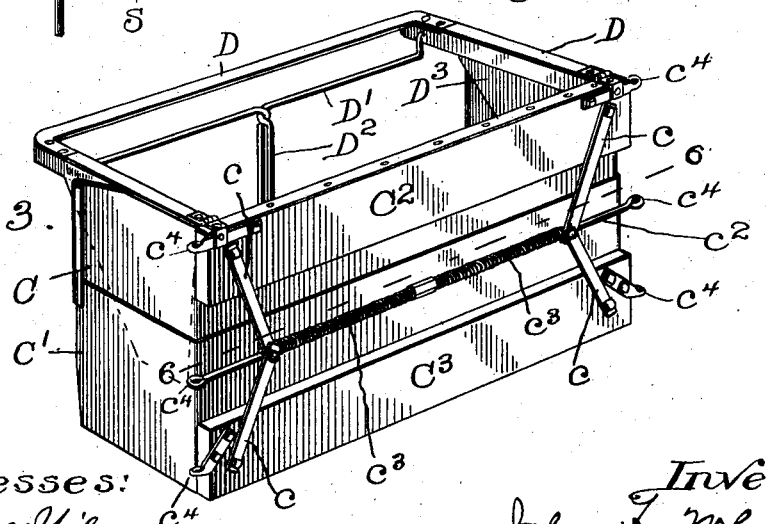
Witnesses:
Russell Wiles
Chas. O. Shurvey
Inventor:
John F. White
by H. Bitner
Atty.

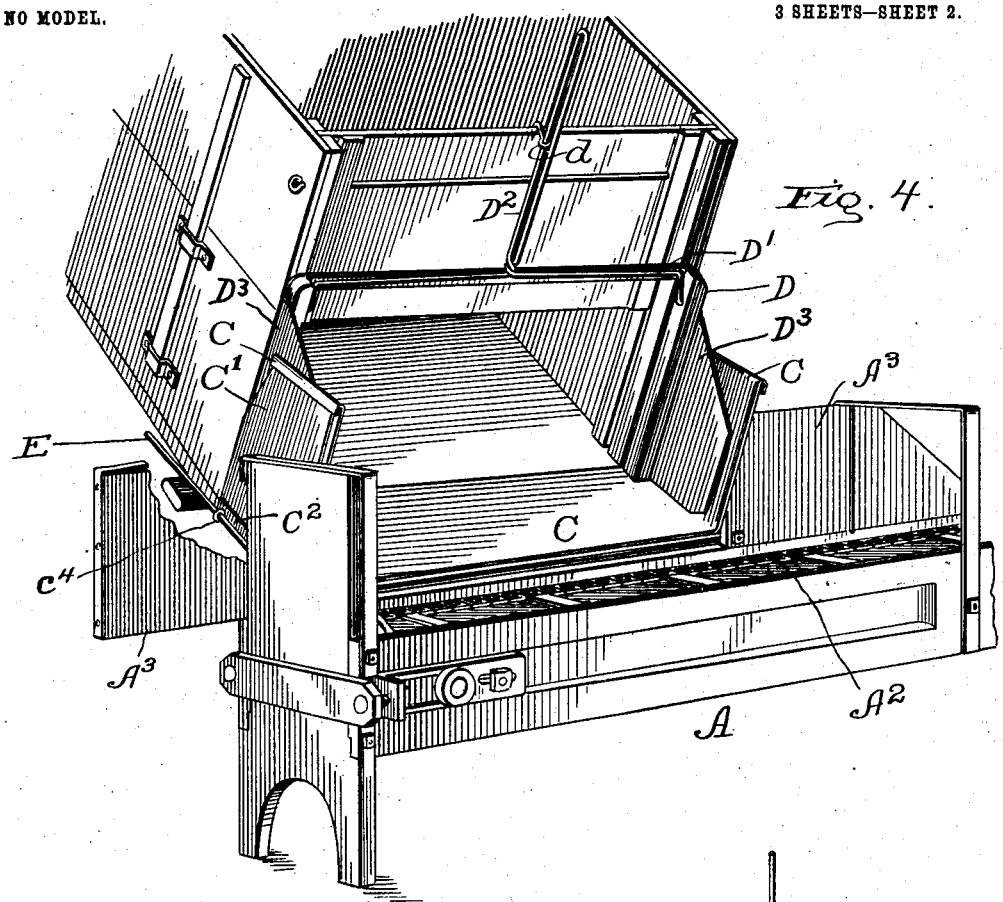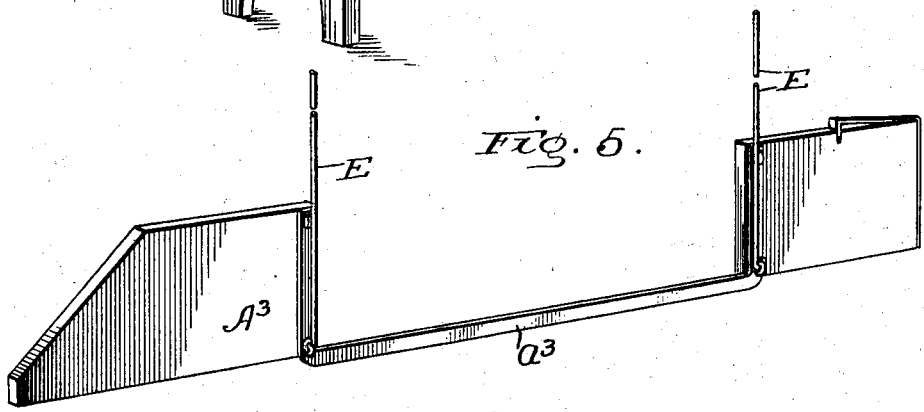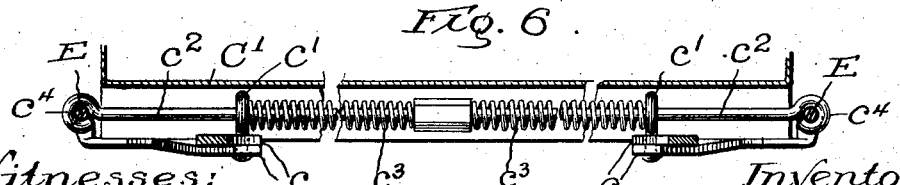

No. 739,243. PATENTED SEPT. 15, 1903.
J. F. WHITE.
ELEVATOR.
APPLICATION FILED MAR. 30, 1903.
NO MODEL. 3 SHEETS—SHEET 3.
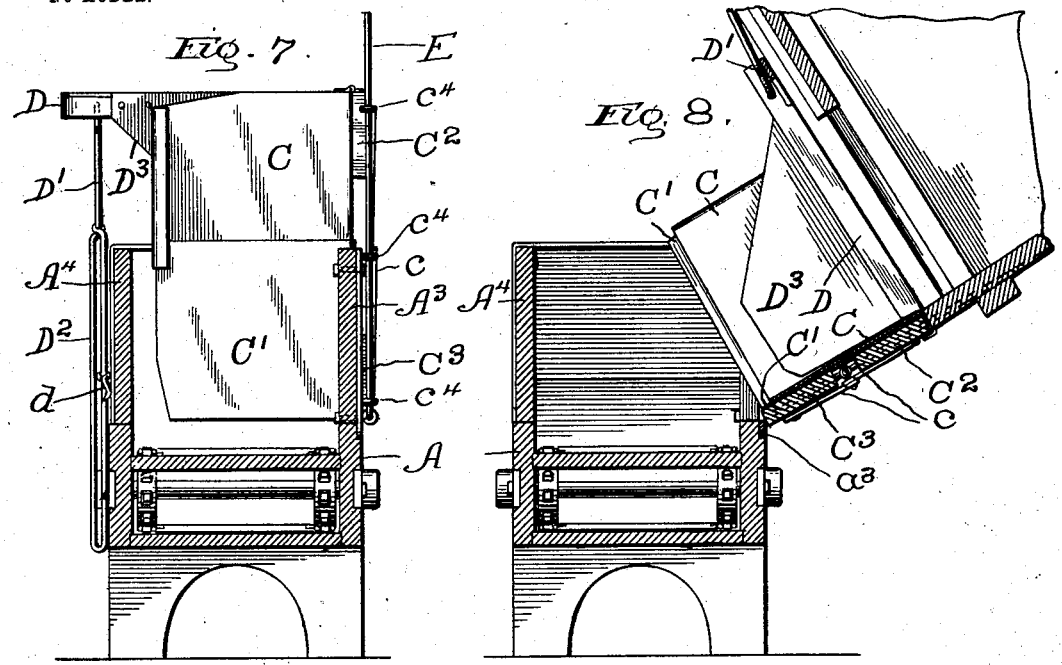
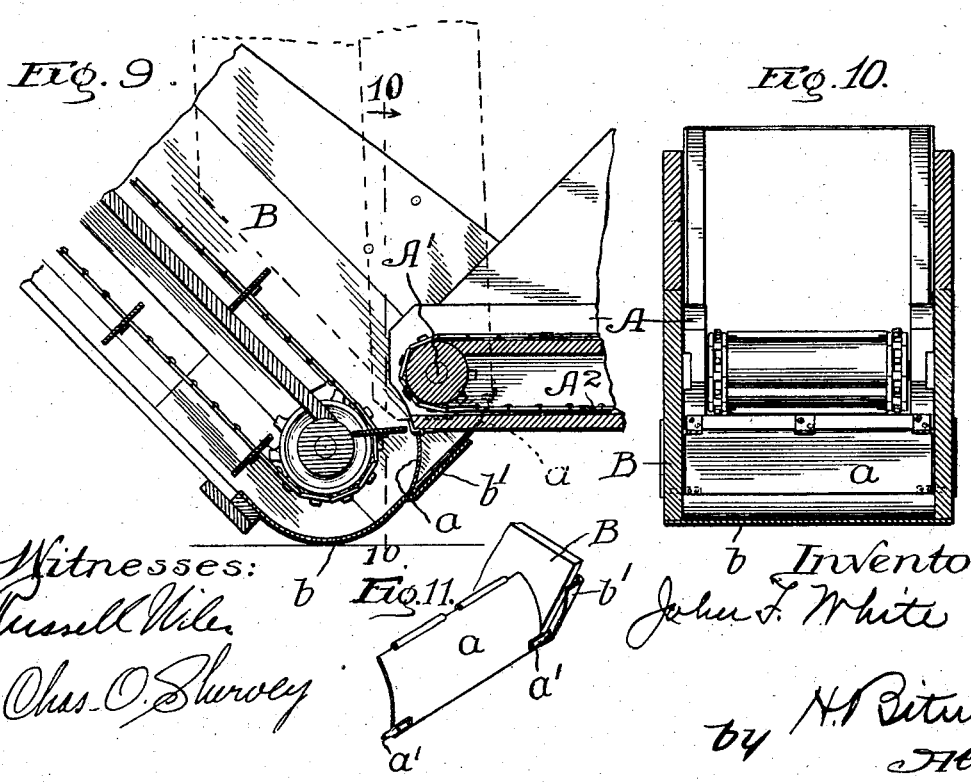

No. 739,243. Patented September 15, 1903.

UNITED STATES PATENT OFFICE.

JOHN F. WHITE, OF BLOOMINGTON, ILLINOIS, ASSIGNOR TO U. S. PORTABLE ELEVATOR CO., OF BLOOMINGTON, ILLINOIS, A CORPORATION OF NEW JERSEY.

ELEVATOR.

SPECIFICATION forming part of Letters Patent No. 739,243, dated September 15, 1903.

Application filed March 30, 1903. Serial No. 150,104. (No model.)

*To all whom it may concern:*

Be it known that I, JOHN F. WHITE, a citizen of the United States of America, residing at Bloomington, in the county of McLean and State of Illinois, have invented certain new and useful Improvements in Elevators, of which the following is a specification.

My invention relates to certain new and useful improvements in elevators. Its object is to produce a device for unloading grains, both small and large, and also vegetables and other like commodities from wagons and other receptacles and lifting or carrying them to suitable places of storage.

To this end my invention consists in certain novel features of construction, which are fully described in the specification and illustrated in the drawings furnished herewith.

In the aforesaid drawings, Figure 1 is a side elevation of my improved elevator. Fig. 2 is a plan thereof. Fig. 3 is a perspective view of the hopper. Fig. 4 is a perspective view of the drag and hopper from the opposite direction to that shown in the previous figures. Fig. 5 is a perspective view of one of the side boards of the drag. Fig. 6 is a horizontal section in the line 6 6 of Fig. 3 looking downward. Fig. 7 is a section in the line 7 7 of Fig. 1 looking in the direction of the arrow. Fig. 8 is a similar section in the line 8 8 of Fig. 1. Fig. 9 is a section in the line 9 9 of Fig. 2. Fig. 10 is a section in the line 10 10 of Fig. 9 looking in the direction of the arrow; and Fig. 11 is a perspective of a portion of a side board of the elevator, showing the flap, which insures a tight joint between it and the drag.

Referring to the drawings, A represents the drag which receives the grain from the wagon, and B indicates the elevator which conveys the grain from the drag upward to any desired place of storage. These two portions are hinged together upon the shaft $A'$, over which runs the conveyer-chain $A^2$ of the drag in such manner that the drag can be swung up to the position shown in dotted lines in Fig. 9.

No detailed description of either the drag or the elevator is necessary, as these devices are fully described and illustrated in a patent issued to me on March 17, 1903, for a grain-elevator, No. 722,788. The only difference between the elevator and drag in this structure and the similar parts in the structure shown and described in the patent above referred to is in the means which is employed to secure a tight joint between the two parts when the drag is swung up, as heretofore pointed out. This connection will now be described, and for this purpose reference will be had to Figs. 9, 10, and 11, which best illustrate the construction. The rounded end (indicated in the drawings by $b$) of the elevator B is prolonged to form an offset straight portion $b'$ substantially at right angles to the length of the elevator B and tangent to the curved portion $b$. To the bottom board of the drag A is pivoted a curved flap $a$, which forms when the drag is down a continuation of the curved end $b$ of the elevator. As seen in Fig. 11, a slight space is left between the side boards of the elevator and the offset portion $b'$, forming guideways in which run pins $a'$ $a'$, secured upon the flap $a$. When the drag is swung up to the position shown in dotted lines in Fig. 9, the flap $a$ moves up to the position indicated for it in dotted lines, thereby keeping continuously a tight joint between the end of the drag and the bottom of the elevator. I consider this method of connection particularly desirable, because it prevents ears of corn from being caught between the conveyer of the elevator and the bottom of the drag and, further, acts when the drag is upended to prevent any waste of small grains.

The other feature of novelty of this elevator lies in the peculiar construction of the hopper by which grain can be received from an ordinary farm-wagon without the use of any spout connected thereto. As in my prior structure, the drag is provided with side boards $A^3$ $A^4$, the side board $A^3$ being cut away at its middle portion to leave an opening, in which the hopper is pivoted, the two parts of this side board being connected by a bar $a^3$, as seen in Fig. 5. The hopper and those portions of the drag immediately adjacent thereto will now be described. The hopper is preferably constructed as follows: Two substantially similar sheet-metal portions C C', each of which in cross-section is three sides of a rectangle, are arranged to telescope together vertically. The three sides of this rectangular structure can conveniently be called the "front" and the two "sides" thereof. To the top of the front portion C and the bottom of the portion C' are secured two boards $C^2$ $C^3$. To each of these boards are pivoted two links $c$, and said links are pivoted together in pairs at their center. The pivot between each of the pairs of links terminates in an eye $c'$, and through the two eyes $c'$ extends a rod $c^2$, upon which are springs $c^3$, which hold the pivots between the pairs of links $c$ normally apart, so as to keep the two sections C C' of the hopper normally pushed apart. It is evident, however, that any great force tending to telescope these two portions will force the pivots of the pairs of links together, compressing the spring $c^3$ and permitting the structure to contract vertically. To the upper board $C^2$ is pivoted a frame D of substantially the same length as the width of a standard farm-wagon and of any desirable width. To this frame is pivotally connected a wire bail D', at the center of which is an outwardly-extending loop $D^2$, composed of two parallel portions, upon which loop runs a hook $d$. To the sides of the frame D are two sheets of metal $D^3$, the purpose of which is to form a grain-guide. At the ends of the boards $C^2$ and on the ends of the rod $c^2$ are provided eyelets $c^4$. The manner in which this hopper is secured to the drag and its operation will probably be most readily understood by reference to Fig. 4. Two rods E E are pivoted to the side board $A^3$ of the drag (see Fig. 5) in such manner that they can be swung outward through the gap provided in this side board. The hopper is placed upon the drag with its front in coincidence with the cut-away portion of this side board, Fig. 1, and rests upon the connecting-bar $a^3$, with the two rods E E passing through the eyelets $c^4$ upon the hopper.

When it is desired to unload the wagon with my improved elevator, the drag is first raised to the position shown in dotted lines in Fig. 9, and the wagon is driven past it, so as to bring its rear end just beyond the line of the drag. The drag is then swung down and the hopper adjusted in proper position to attach to the end of the wagon. The frame D on the upper end of the hopper is then swung up, so as to come against the rear board of the wagon, and hooked in place by engagement of the hook $d$ with the top half of the end-board of the wagon, as shown in Fig. 4. The bottom half of the end-board is then removed, permitting the grain to run out. The grain is guided into the drag by the two pieces $D^3$ $D^3$ and the telescoping portions C C' of the hopper. The front wheels of the wagon are then raised by means of a wagon-jack. This of course lowers the rear end of the wagon and moves it forward, inasmuch as the center about which the wagon swings as its front wheels are raised is the axle of the rear wheels. As the rear end of the wagon moves in this direction—that is, downward and forward—the hopper is telescoped and swung out from the drag from the position shown in Fig. 7 to the position shown in Fig. 8. By the time this position is reached the bottom of the wagon has such an inclination that all its contents will be discharged into the drag, following the chute made by the hopper. By means of this improved hopper a device is provided which continuously affords a tight chute for grain and prevents any spilling thereof. A further advantage of this device consists in the fact that the grain begins to flow from the wagon immediately after the rear board is removed and takes place during the tilting of the wagon. In this way a great deal of time is saved and more loads can be received by the elevator in a given time. A spring S (shown in Figs. 1 and 2) is secured to the drag and elevator somewhat above the pivotal connection between the two and adapted to partially counterbalance the weight of the drag, whereby the same may be raised or lowered with greater ease. This spring S is so arranged that when the drag is down the spring lies close to the line of the pivot between the drag and the elevator and so that a little force is exerted to raise the drag. As the drag is swung up, however, the line of the spring swings away from the line of the pivot and a greater lifting force is exerted. This arrangement is particularly advantageous, because when the drag is in position to receive grain it is practically immovable, its weight holding it down firmly in position, while if any other arrangement of the spring were used special mechanism would have to be adapted to lock the drag in position. After the raising of the drag has been started, however, the spring immediately comes into play and greatly assists the operator.

I realize that considerable variations are possible in the details of this construction without departing from the spirit of the invention, and I therefore do not intend to limit myself to the specific form herein shown and described, except as pointed out in the claims.

I claim as new and desire to secure by Letters Patent—

1. In a device of the class described, the combination with an elevator and a drag pivotally secured thereto, of a curved end piece on the elevator-frame and a flap pivotally secured to the end of the drag adjacent to the elevator and adapted to keep a tight joint between said drag and said end piece as said drag is rotated upon its pivot.

2. In a device of the class described, the combination with a suitable drag and an elevator, of a yielding hopper secured to the drag and arranged to receive grain from a standard wagon without an intermediate chute, said hopper being constructed to yield as said rear end of the wagon descends upon it.

3. The combination with a drag and an elevator, of a telescoping hopper connected to the drag and arranged to receive grain from a standard wagon without an intermediate chute and being constructed to telescope under the weight of the wagon when the latter is tilted.

4. The combination with a drag and an elevator, of a hopper secured to the drag, consisting of two telescoping sections constructed and arranged to receive grain from a standard wagon without an intermediate chute, and means for exerting spring-pressure to keep the sections of the hopper distended, substantially as described.

5. The combination with a drag and an elevator, of a hopper pivotally secured to the drag and arranged to receive grain from a standard wagon without an intermediate chute.

6. The combination with a drag and an elevator, of a telescoping hopper pivoted to the drag and arranged to receive grain from a standard wagon without an intermediate chute.

7. The combination with a drag and an elevator, of a hopper consisting of two telescoping sections spring-pressed apart, pivotally secured to the drag, and means for securing the hopper to the rear of a standard wagon.

8. The combination with a drag and an elevator, of a telescoping hopper, and means for holding the same normally distended, a frame pivoted to the upper portion of the hopper, and means for securing said frame to the rear board of a standard wagon.

9. The combination with a drag and an elevator, of a telescoping hopper composed of two sections, two pairs of links connecting the sections and pivoted together in pairs, and springs holding the pivots of said pairs of links normally apart to distend said hopper.

10. The combination with a drag and an elevator, of a hopper consisting of two telescoping sections secured to the drag, two pairs of pivoted links secured to the sections of the hopper, a rod supported by said links at their pivots with one another and movable with respect thereto, and coiled springs surrounding said rod to press the pivots of said links apart and distend said hopper.

11. The combination with a drag and an elevator, of a hopper secured to the drag, a frame pivoted to the upper edge of the hopper and adapted to be secured to the rear end of a wagon, and guide-boards secured to said frame to guide grain from the wagon into the hopper.

12. The combination with a drag and an elevator, of two rods pivotally secured to the drag, and a hopper provided with eyelets adapted to be slipped over said rod, whereby said hopper can be pivotally secured to said drag and readily removed therefrom.

13. The combination with an elevator and a drag pivotally secured thereto, of a spring connecting the drag and elevator and adapted to partially counteract the weight of the drag, said spring lying, when the drag is down, adjacent to the pivot between said drag and elevator, whereby the lifting force of the spring comes into play only when the drag is partially raised.

In witness whereof I have signed the above application for Letters Patent, at Bloomington, in the county of McLean and State of Illinois, this 25th day of March, A. D. 1903.

JOHN F. WHITE.

Witnesses:
W. C. GILMORE,
MABEL DAVISON.